Nov. 5, 1968  L. L. SLATES ET AL  3,408,802
HARVESTING DEVICE
Filed March 30, 1966  9 Sheets-Sheet 3
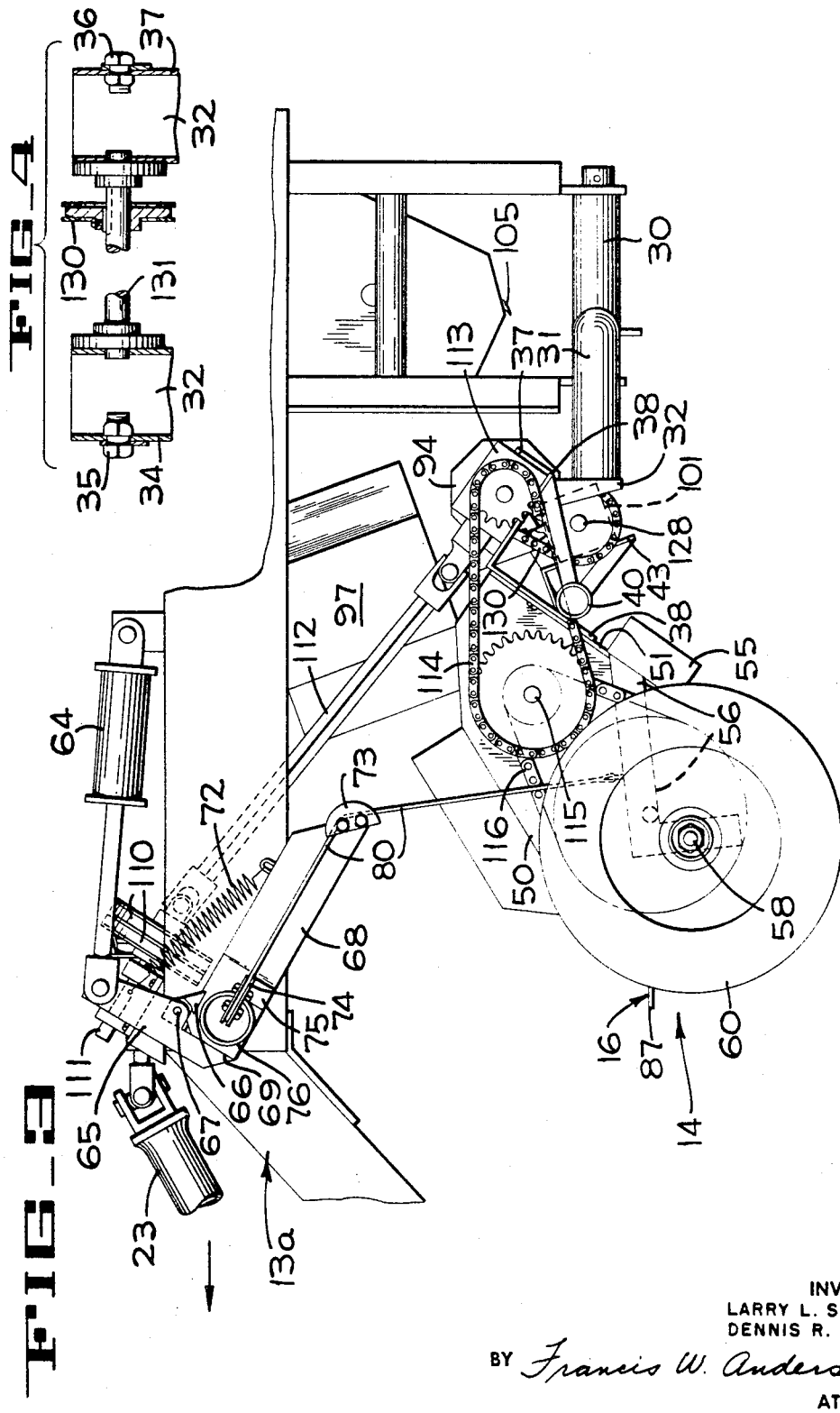
INVENTORS
LARRY L. SLATES
DENNIS R. SCHULTZ
BY *Francis W. Anderson*
ATTORNEY

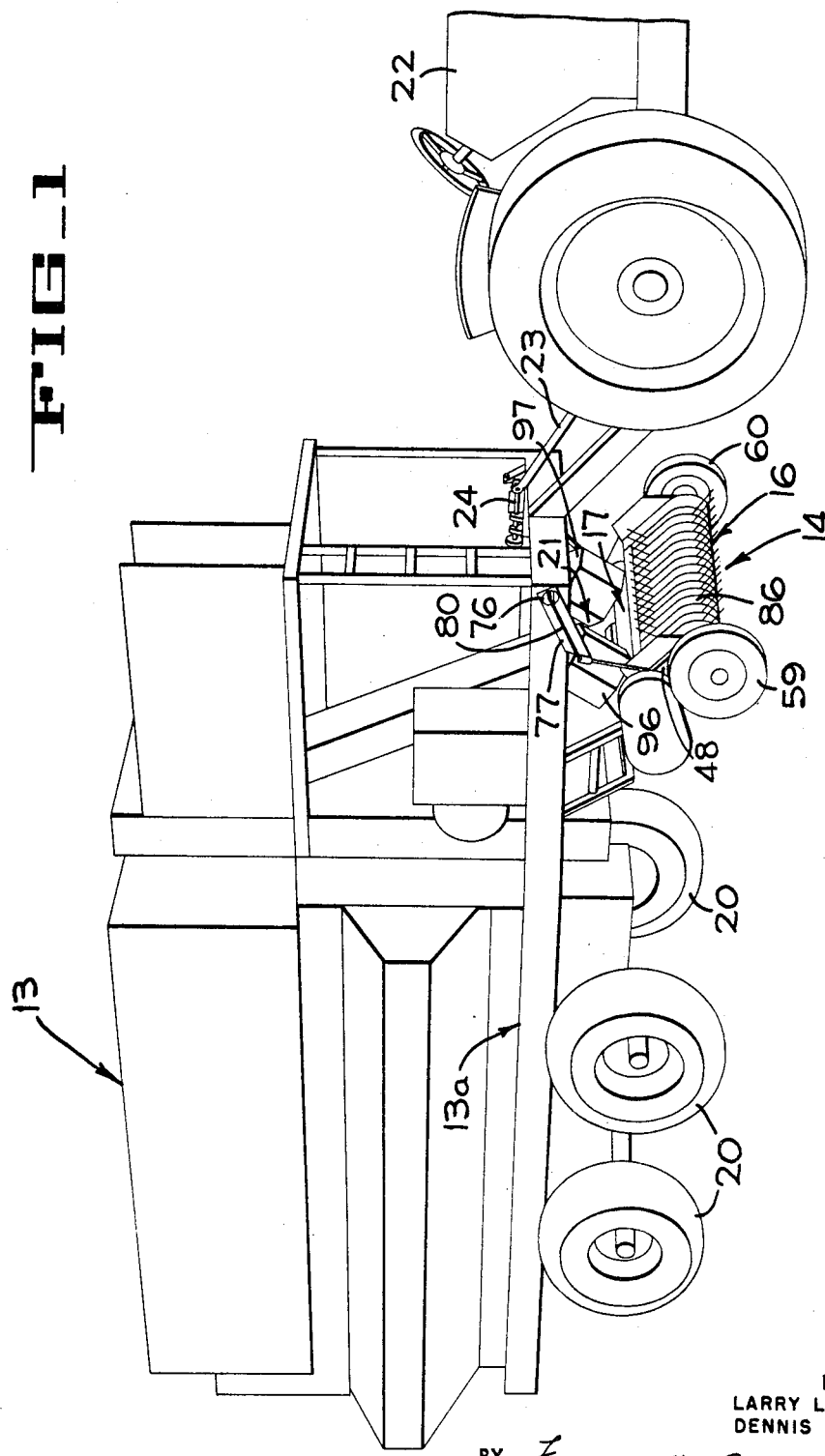

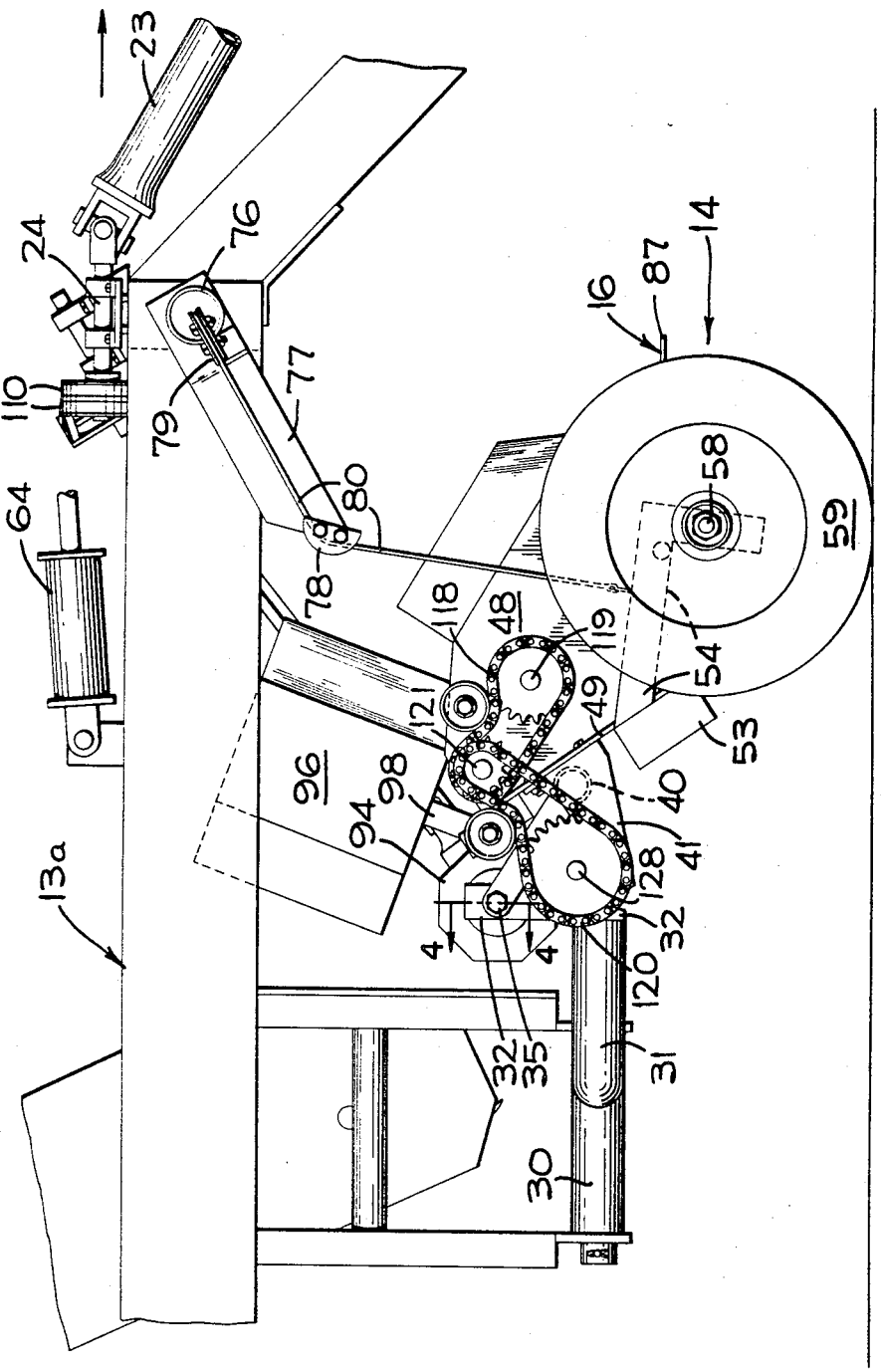

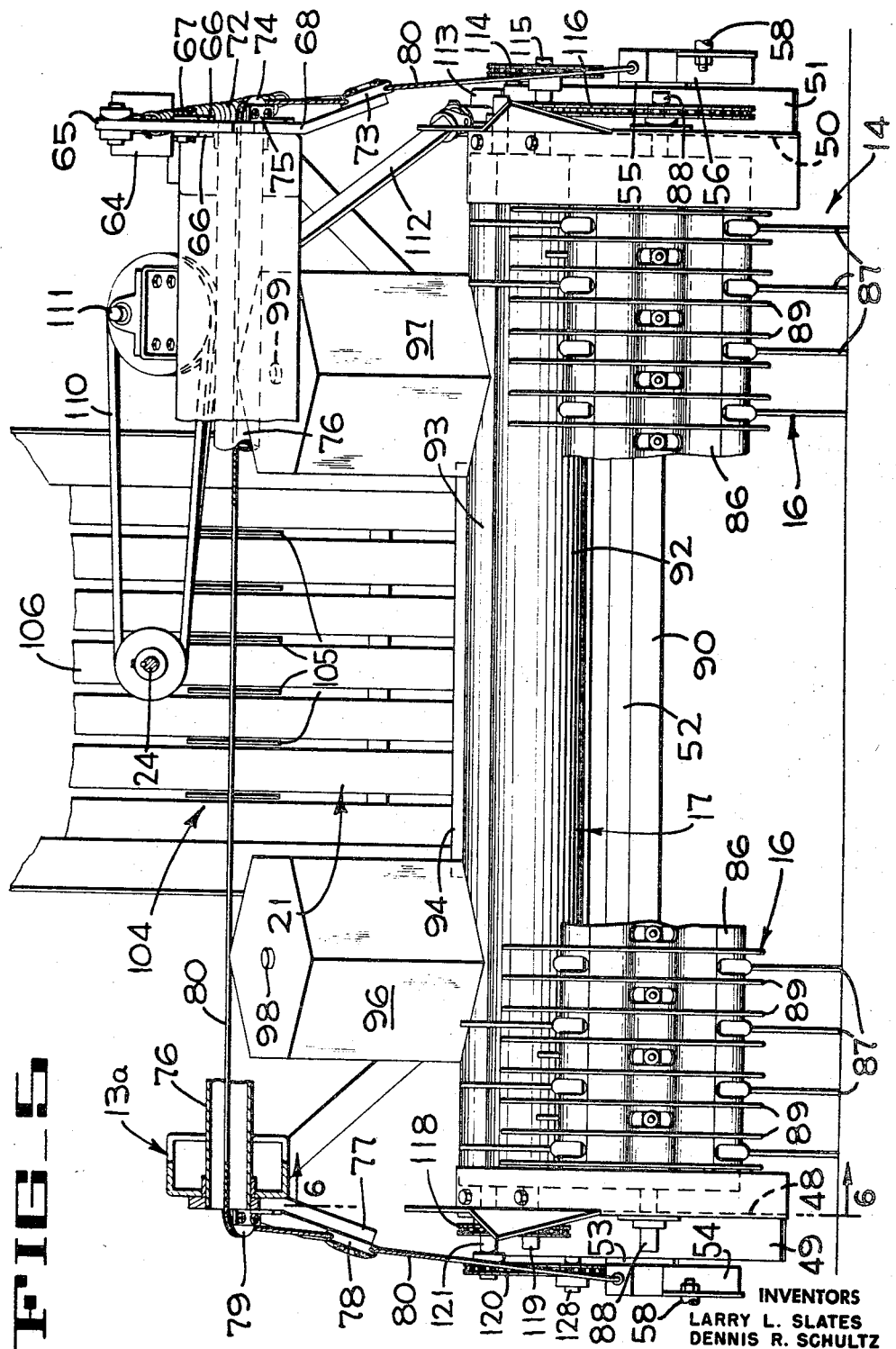

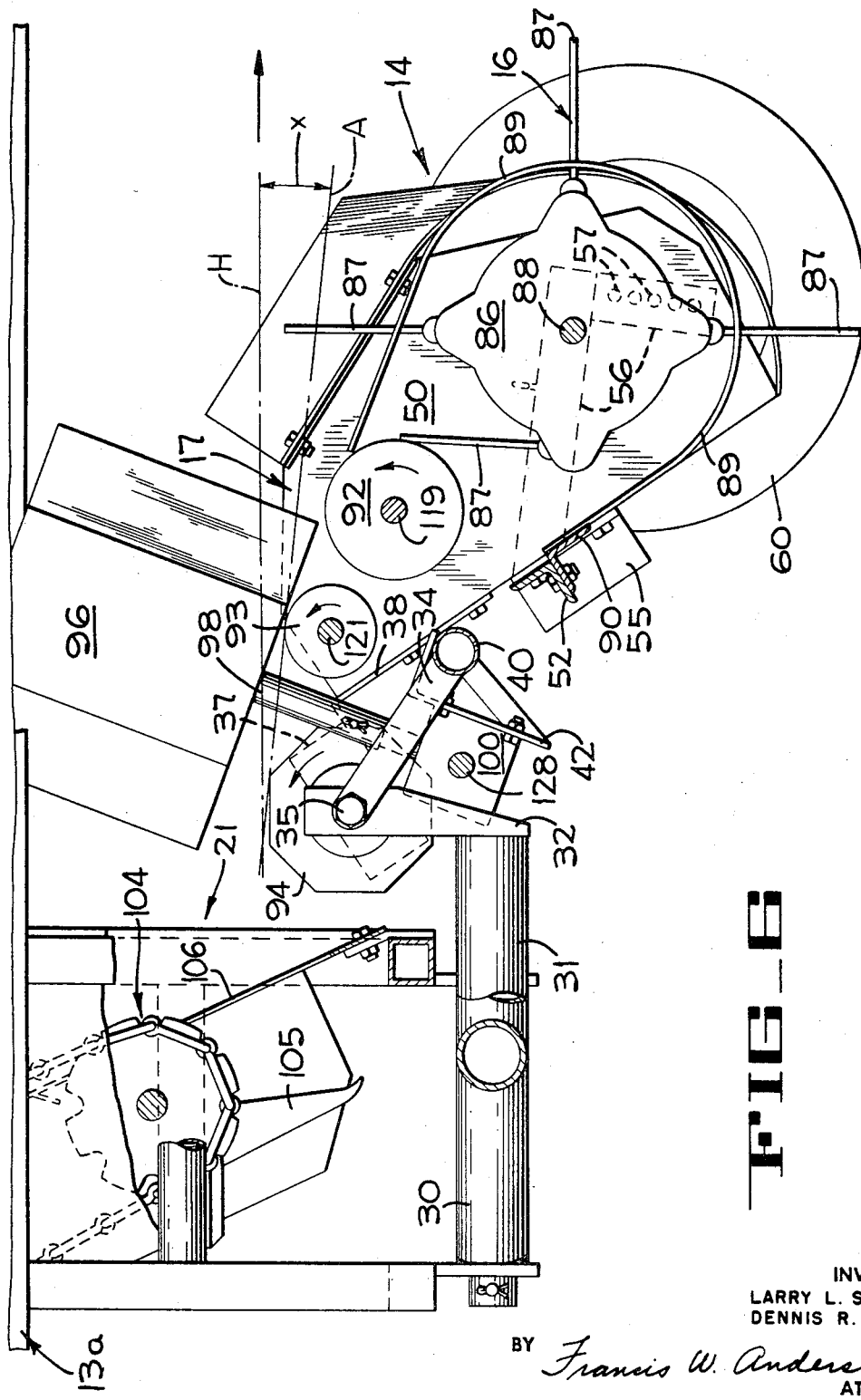
FIG_6
INVENTORS
LARRY L. SLATES
DENNIS R. SCHULTZ
BY *Francis W. Anderson*
ATTORNEY Nov. 5, 1968   L. L. SLATES ET AL   3,408,802
HARVESTING DEVICE
Filed March 30, 1966   9 Sheets-Sheet 6
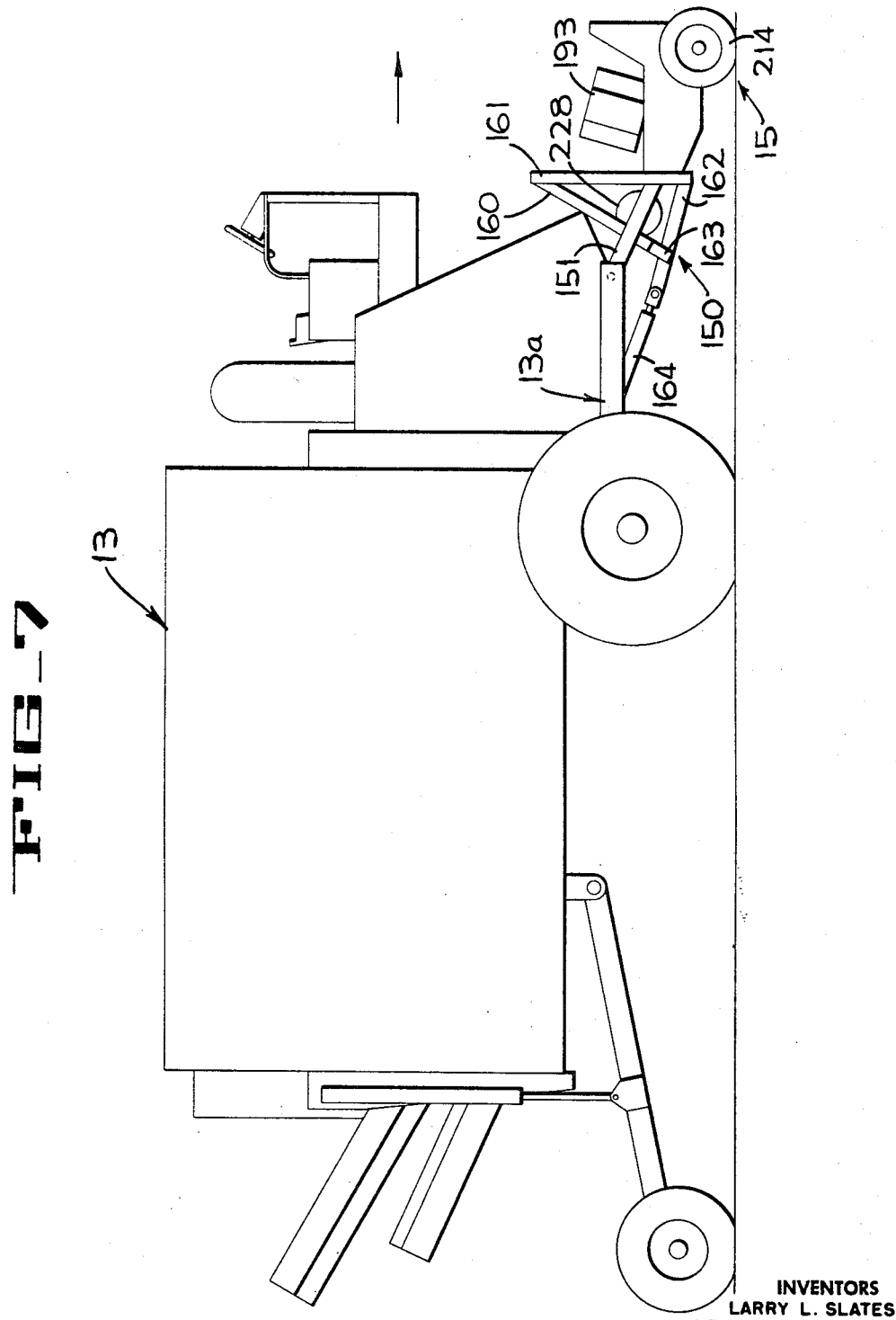
INVENTORS
LARRY L. SLATES
DENNIS R. SCHULTZ
BY Francis W. Anderson
ATTORNEY

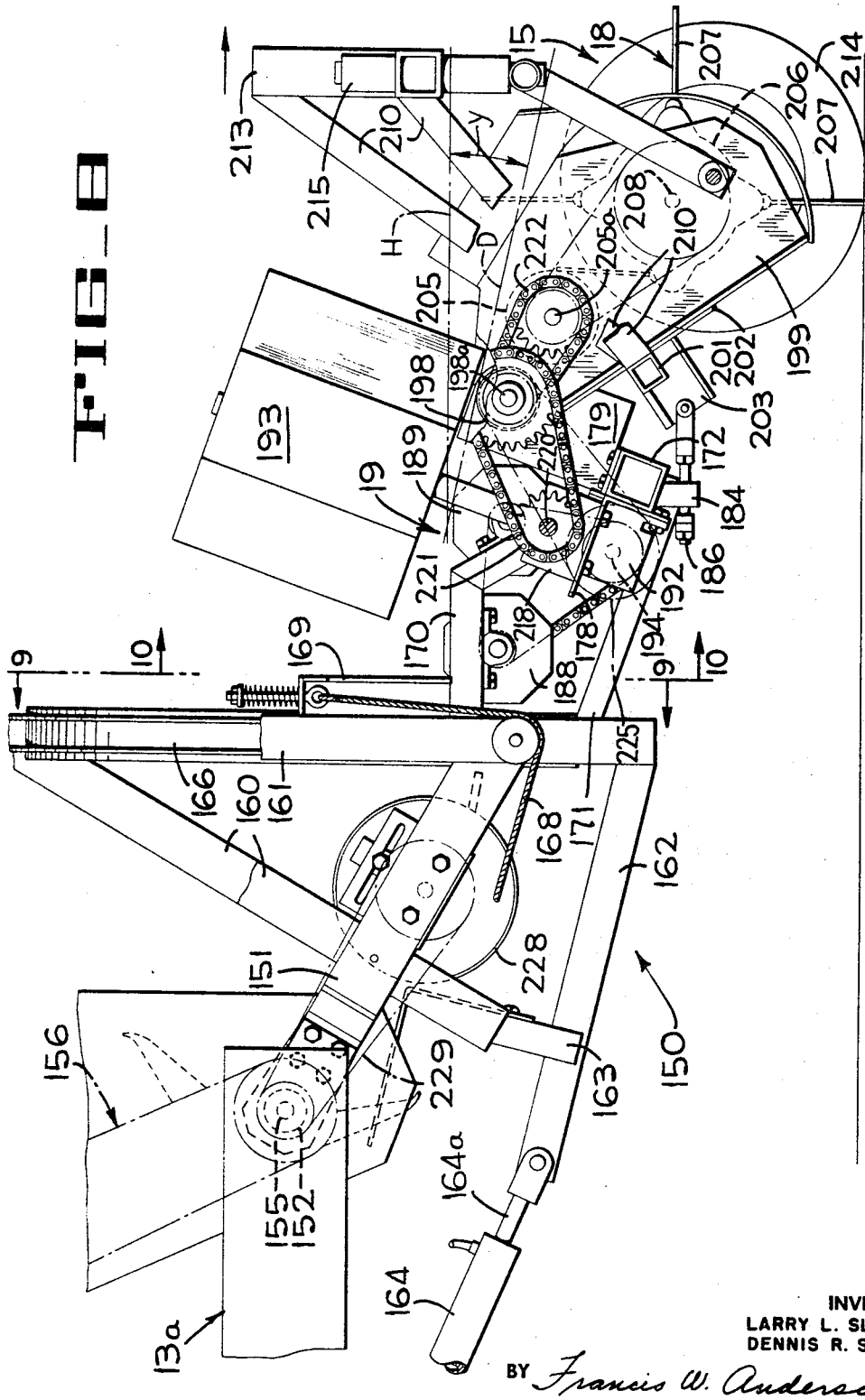

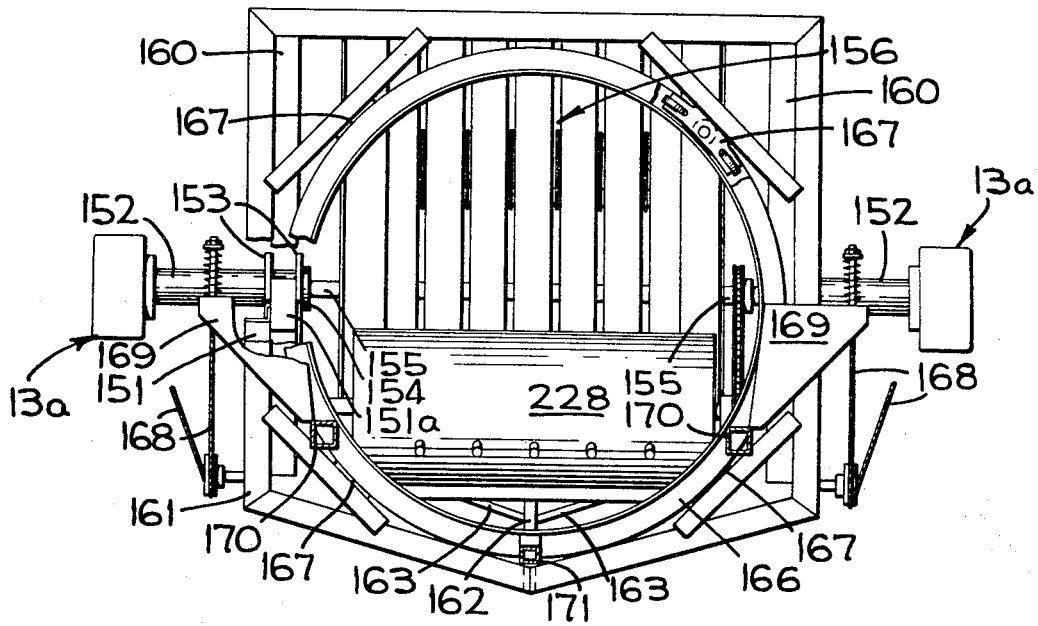
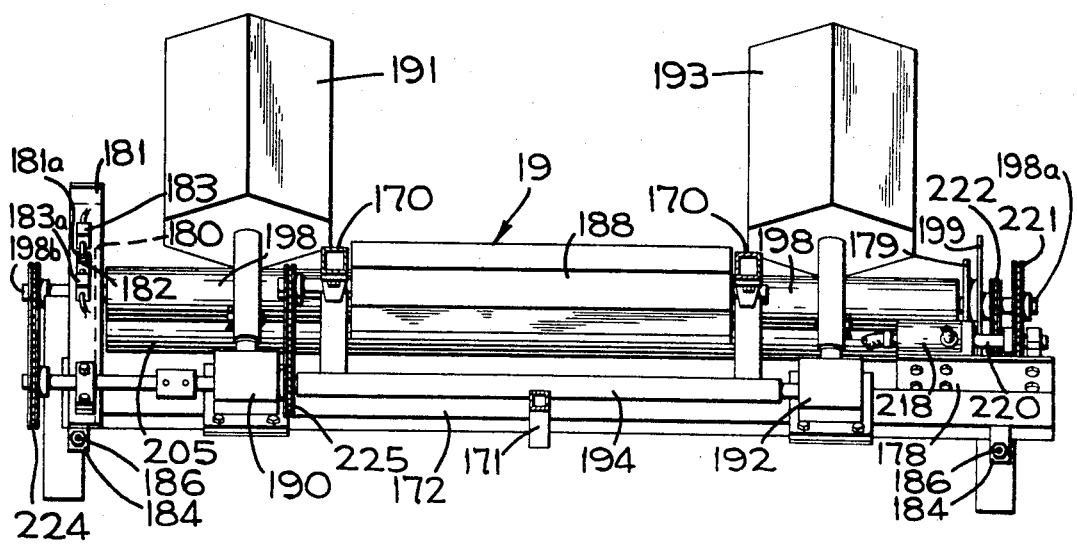

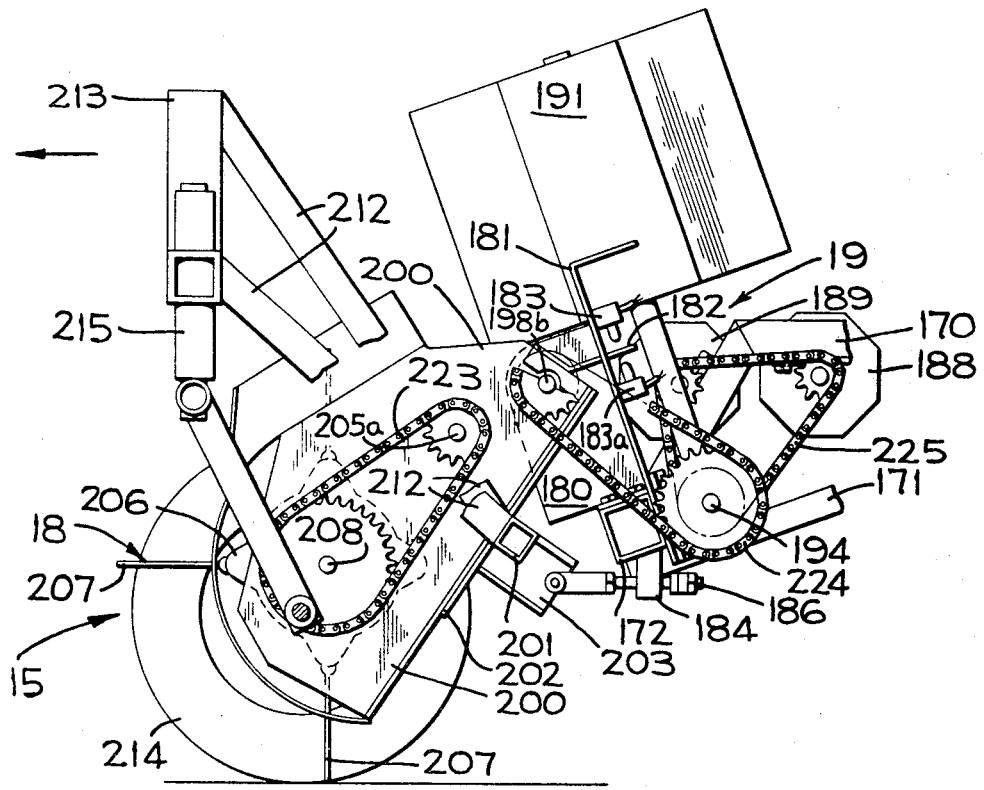
FIG_11
FIG_12
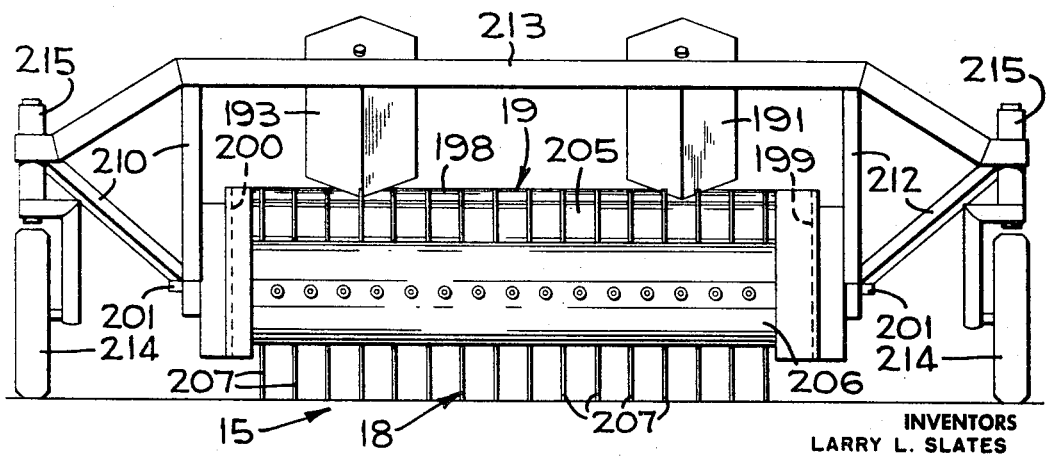

United States Patent Office 3,408,802
Patented Nov. 5, 1968

3,408,802
HARVESTING DEVICE
Larry L. Slates, Wellington, and Dennis R. Schultz, Rossville, Ill., assignors to FMC Corporation, San Jose, Calif., a corporation of Delaware
Filed Mar. 30, 1966, Ser. No. 538,689
10 Claims. (Cl. 56—364)

The present invention pertains to harvesting devices and, more particularly, to devices employed to harvest vine crops, such as, peas and the like.

At least two types of harvesters for gathering vine crops have heretofore been employed. One of these is known as a "pull-type" harvester, and this type is pulled by a tractor and often receives a portion or all of its power from the power take-off of the tractor. Another type is known as a "self-contained" harvester which is usually powered and controlled from a station on the harvester itself. The latter type harvester is most often employed in hilly areas and thus is often driven over steeply sloped ground.

One of the problems in the use of these harvesters is that vine crops become easily entangled while being compressed and transferred from the ground to the inlets of the harvesters. Particularly is this so in the case of pea vines which are moist and slippery, and have tendrils, stems and vines which usually are intertwined. Pea vines also have a strong tendency to maintain a given path of travel, that is, they are not easily diverted. Because of these conditions, pea vines tend to roll up into a ball while they are being transferred and compressed.

It has been found, however, that by arranging specially shaped transferring and compressing elements and, more importantly, by controlling the angle with respect to the horizontal of the path through which the vines are moved, the above problems are alleviated. Accordingly, these principles have been embodied in the structure hereinafter to be described.

It is an object of this invention to provide improved apparatus for transferring crops from the ground to the inlets of both the pull and self-contained types of vine crop harvesters.

It is another object of this invention to provide a gathering unit for a vine crop harvester which transfers the vines within a limited range of angles with respect to the horizontal while compressing them into a narrower path.

It is another object of this invention to provide a gathering unit for a vine crop harvester wherein the shapes of the transferring elements are particularly adaptable for facilitating the transfer of pea vines and the like.

Still another object is the provision of a gathering unit for self-contained type vine crop harvester which is continually positively adjusted to maintain the angle of the path through which the crop is moved within certain limits while the crop is being transferred and compressed.

Other objects and advantages of the invention will become apparent from the following detailed description and drawings, in which:

FIGURE 1 is a schematic perspective of a pull-type vine crop harvester employing the principles of the invention.

FIGURE 2 is an enlarged fragmentary elevation of a portion of the left side of the harvester shown in FIGURE 1.

FIGURE 3 is an enlarged fragmentary elevation of a portion of the harvester shown in FIGURE 1 as viewed from the right side of the harvester and opposite the side from which FIGURE 2 was taken.

FIGURE 4 is an enlarged fragmentary vertical section taken along the line 4—4 of FIGURE 2.

FIGURE 5 is an enlarged fragmentary front elevation, with parts broken away, of a portion of the harvester shown in FIGURE 1.

FIGURE 6 is an enlarged fragmentary vertical section taken along the line 6—6 of FIGURE 5 with parts broken away.

FIGURE 7 is a schematic side elevation of a self-contained vine crop harvester embodying the principles of the invention.

FIGURE 8 is an enlarged fragmentary side elevation with parts broken away of the crop harvester shown in FIGURE 7.

FIGURE 9 is an enlarged fragmentary section taken along the line 9—9 of FIGURE 8.

FIGURE 10 is an enlarged fragmentary section taken along the line 10—10 of FIGURE 8.

FIGURE 11 is a fragmentary side elevation with parts broken away, of the right-hand side of the crop harvester shown in FIGURE 7.

FIGURE 12 is a schematic front elevation of a portion of the crop harvester shown in FIGURE 7.

In general, both the pull-type and the self-contained type vine crop harvesters comprise threshing units 13 (FIGS. 1 and 7) which are provided with frames 13a. The details of these threshing units form no part of the subject invention with the exception of their inlets, the locations of which do form an important relationship with parts hereinafter to be described. Likewise, both he former and the latter harvesters include gathering units 14 and 15, respectively. The gathering unit 15 for the self-contained type vine crop harvester differs somewhat from the gathering unit 14 for the pull-type harvester; however, both of the gathering units include a pick-up unit and a crop transferring device. The pick-up unit and the crop transferring device for the pull-type harvester are shown in FIGURE 6 and are designated by the numerals 16 and 17, respectively. The pick-up unit and the crop transferring device for the self-contained harvester are best shown in FIGURE 8 and are designated by the numerals 18 and 19, respectively. In both of the harvesters the vine crop is raised from the ground by the pick-up unit and moved to a plane above the pick-up unit. The vines are then moved upwardly and rearwardly by the respective crop transferring devices into the inlet of the threshing unit. The relationship between the pick-up units, the crop transferring devices and the location of the inlets on the respective harvesters form an important part of this invention as will be hereinafter more clearly pointed out.

The pull-type vine crop harvester is shown in FIGURES 1-6 and as shown generally in FIGURE 1 comprises the threshing unit 13 which is mounted on wheels 20 and has an inlet indicated generally by the numeral 21 (FIG. 6). A tractor 22 is connected to the harvester in a conventional manner with its power take-off shaft 23 operatively connected to a power shaft 24 rotatably mounted on the frame 13a. In this manner the tractor pulls the harvester over the field and also supplies power to the gathering unit 14.

The gathering unit 14 is best shown in FIGURE 2-6 and comprises a tubular rock shaft 30 journalled on the frame 13a. A pair of laterally extending tubular elbows 31 are welded to the rock shaft, and mounted on the forward ends of the elbows are a pair of upright brackets 32 (FIGS. 3 and 6). For convenience, the side of the machine shown at the left in the front view of FIG. 5 will be called the left side of the machine and the opposite side will be called the right side. As best shown in FIGURE 6, a pivot arm 34 is pivotally mounted on the left-hand upright bracket by a bolt 35. The pivot arm forms a part of a structure for pivotally mounting the gathering unit for movement in a vertical plane. Pivotally mounted on the right-hand upright bracket by a bolt 36 (FIG. 4) is a pivot plate 37 which is welded to an L-shaped plate 38. Both the pivot arm and the L-shaped plate are welded at their lower ends to a transverse tubular support 40. Fastened to the left-hand end of the tubular support for a purpose to be later described is a triangular end plate 41 (FIG. 2). Also fastened to the tubular support and rearwardly disposed therefrom are left-hand and right-hand mounting plates 42 (FIG. 6) and 43 (FIG. 3), respectively. The pivot arm 34, pivot plate 37, L-shaped plate 38, triangular end plate 41, mounting plates 42 and 43, and tubular support 40 form an integral unit pivotally mounted on the upright brackets 32.

As is best shown in FIGURES 2, 3 and 4 the gathering unit 14 also includes a left-hand side plate 48 (FIG. 2) having a laterally and outwardly extending rear flange 49 and a right-hand side plate 50 (FIG. 3) having a laterally and outwardly extending rear flange 51. The flange 49 on the left-hand side plate is bolted to the triangular end plate 41, and the flange on the right-hand side plate is mounted on the L-shaped plate 38 thus pivotally connecting the side plates to the upright brackets 32. A transverse angle brace 52 (FIG. 6) is bolted to left- and right-hand wheel support brackets 53 and 55 which are bolted to flanges 49 and 51 respectively. Also connected to the wheel support brackets 53 and 55 as by welding are forwardly extending wheel support members 54 and 56. Both of the wheel support members are apertured as at 57 (FIG. 6) to adjustably receive stub axles 58. Rotatably mounted on the axles are conventional wheels 59 and 60 which support the front end of the gathering unit. As can be readily seen, as the wheels rise and fall over the terrain the entire gathering unit oscillates about the upright brackets 32.

Means are provided for positively raising and lowering the gathering unit 14 which, as best shown in FIGURE 3, comprises a hydraulic actuator 64. The hydraulic actuator is pivotally connected at its rear end to the frame 13a and is pivotally connected at its forward end to a lever arm 65. The lever arm is pivotally fastened by a pin 67 to a set of spaced ears 66 (FIGS. 3 and 5), one of which is shown partially broken away for clarity. The ears are welded to opposite sides of a lift arm 68. The lever arm 65 is so shaped that it abuts against the upper surface of the lift arm 68 just below the pin 67 when the hydraulic actuator is retracted, that is, when the top of the lever arm is pulled toward the rear of the machine. When the hydraulic actuator is extended to pivot the lever arm counterclockwise (FIG. 3), it abuts against the end of the lift arm as at 69. A spring 72 urges the lever arm into normal engagement with the upper surface of the lift arm. Fixed to the free end of the lift arm is an outer half-sheave 73. An inner half-sheave 74 is fixed to a bracket 75 welded to the vertical face of the lift arm. The lift arm is apertured at its inner end to receive the right-hand end of a pipe member 76 which is welded thereto and extends transversely across the entire width of the frame 13a. As best shown in FIGURES 2 and 5, the left-hand end of the pipe is welded to a left-hand lift arm 77. Similarly two half-sheaves 78 and 79 are fastened to the left-hand lift arm in the same manner as the half-sheaves 73 and 74 were fastened to the right-hand lift arm. A flexible cable 80 is fastened to each of the wheel support members 54 and 56 and passes over the half-sheaves and through the pipe member. The pipe member is journalled for rotation in bushings 81 (FIG. 5) which are welded to the frame 13a. Movement of the hydraulic actuator 64 raises or lowers the gathering unit about the upright brackets 32 and, since the cable is free to slide in the respective half-sheaves the left- and right-hand wheels will be raised equal amounts each time the actuator is moved in a unit-raising direction even if they are initially at different heights.

The pick-up unit 16 includes a conventional pick-up reel 86 (FIGS. 5 and 6) having a plurality of transversely spaced tines 87 resiliently mounted thereto. The reel is fastened to a shaft 88 which is rotatably mounted in the left- and right-hand side plates 48 and 50. A plurality of stripper fingers 89 are welded to a transverse angle member 90 which is bolted to angle member 52.

The crop transferring device 17, as is best shown in FIGS. 5 and 6, comprises a cylindrical forward roller 92 and a cylindrical intermediate roller 93 both journalled for rotation in the side plates 48 and 50. An octagonal roller 94 is journalled for rotation in the upright brackets 32. As will be more clearly pointed out below, the shape and location of these rollers form an important part of the invention. Two hexagonal gathering drums 96 (FIG. 2) and 97 (FIG. 3) are mounted on generally vertical shafts 98 and 99 (FIG. 5). The shafts are journalled for rotation respectively, in a left-hand gear box 100 (FIG. 6) and an identical right-hand gear box 101 (FIG. 3). The bottom surfaces of the drums overlie and are closely adjacent the upper surfaces of the intermediate and hexagonal rollers.

As is best shown in FIGURE 6, a chain driven elevator 104 has its lower end positioned at the inlet 21 of the threshing unit 13. The elevator includes a plurality of transversely spaced lifting fingers 106 which pass through the inlet and move upwardly toward the threshing unit. A slotted plate 106 through which the fingers pass in their upward travel is positioned over the mouth of the inlet.

The drive for the gathering unit 14 is best shown in FIGURES 2, 3 and 5. The unit is preferably powered from the power take-off of the tractor which, as aforementioned, drives the power shaft 24 (FIG. 2). A belt and pulley drive 110 (FIG. 5) connects the power shaft 24 with an inclined intermediate shaft 111. The intermediate shaft is journalled for rotation on the frame 13a and is connected to a drive shaft 112 through a universal joint. The drive shaft is connected through a gear box 113 (FIG. 3) mounted on the upper surface of the L-shaped plate 38 to a first chain drive 114 that drives a shaft 115 to which the forward roller 92 is keyed. A second chain drive 116 connects the shaft 115 to the shaft 88 of the pickup reel. A third chain drive 118 (FIG. 2) connects a shaft 119 at the left-hand end of the forward roller 92 with a shaft 121 to which the left-hand end of the intermediate roller 93 is secured. A fourth chain drive 120 connects the shaft 121 with a shaft 128 which passes through and drivingly connects the gear boxes 100 and 101 of the gathering drums 96 and 97. The gatering drums are driven in directions such that they rotate toward one another, in other words, the drum 96 rotates in a counterclockwise direction and the drum 97 rotates in a clockwise direction as view in FIGURE 5. As best shown in FIGURES 3 and 4, the shaft 128 extends through the gear box 101 and is connected by a chain drive 130 with the axle 131 of the octagonal roller 94. The elevator 104 is preferably driven by a power mounted on the threshing unit 13 by any conventional means. As is readily apparent, the power take-off shaft drives the gear box 113 to rotate the forward roller 92, the intermediate roller 93, and the octagonal roller 94 in a counterclockwise direction as viewed in FIGURE 6. Likewise the gathering drums and the pick-up reel are also driven from the power take-off shaft. As the harvester is moved across a field, the pick-up mechanism lifts the vines upwardly to the forward roller 92. The forward roller passes them rearwardly onto the top surface of the intermediate roller 93 where they are moved by the intermediate roller and the hexagonal gathering drums 96 and 97 rearwardly onto the octagonal roller 94. The octagonal roller pulls the vines rearwardly and throws them onto the slotted plate 106 where the elevator fingers 105 gather them up and lift them toward the threshing unit.

As aforementioned, an important aspect of this invention is the angle maintained between a plane lying across the top surfaces of the intermediate roller 93 and the hexagonal roller 94 and the horizontal. This angular relationship is best shown in FIGURE 6 wherein the line A represents a plane lying over the top surfaces of the intermediate roller 93 and the hexagonal roller 94. The line A is inclined downwardly at an angle with respect to the horizontal, which is indicated by the line H, and this angle is represented by the reference character $x$. The unique characteristics of vine crops, such as, pea vines and the like, require that this angle $x$ not exceed 15° downwardly with respect to the horizontal in normal use. If this angle exceeds 15°, the vines will tend to ball up between the hexagonal drums and will not pass on to the elevator 104. This maximum angle of course will vary somewhat with the type and condition of the vines being transferred. It is at all times, however, far less than the angle which could be used with a non-vine crop, such as, hay.

The angle $x$ is maintained within its maximum downward limit during normal operations by interposing the octagonal roller 94 between the elevator 104 and initially positioning the axis of the octagonal roller vertcally lower than the axis for the intermediate roller 93. In this manner, downward movement of the wheels during normal operation will seldom be sufficient to cause the angle $x$ to exceed the maximum angle of 15°.

A second feature of importance is the shape of the octagonal roller 94. Since this roller must throw the vines a considerable distance as well as assist in pulling them through the hexagonal drums 96 and 97, it must have a sufficiently uneven surface to prevent the vines from slipping. Thus, for example, a round roller used in place of the octagonal roller 94 would be completely inadequate to transfer the compressed vines to the elevator 104.

The self-contained harvester which is best shown in FIGURES 7-12 is in many respects identical to the pull-type harvester previously described. For this reason the description of the self-contained harvester will be limited to the essential different structure necessary to describe its operation. As best shown in FIGURE 8, the self-contained harvester differs from the pull-type harvester by the addition of a leveling device 150. The leveling device comprises a left-hand pivot beam 151 (all left and right-hand designations hereinafter used are as viewed from the front of the machine) and a similar right-hand pivot beam, not shown, pivotally connected to a pair of aligned tubular stub shafts 152 (FIG. 9) by mounting blocks 151a (only one being shown). The tubular stub shafts 152 are fixed to left-hand and right-hand sides of the frame 13a. Both of the pivot beams are fastened to the tubular stub shafts in the same manner. As best shown in FIGURE 9, each pivot beam has a mounting block 151a welded to its inside face. Each mounting block has welded thereto a pair of spaced pivot plates 153 which are apertured to receive one of the stub shafts 152. The inner pivot plate 153 on each pivot beam has a bearing 154 fixed thereto. The two bearings 154 rotatably receive a drive shaft 155 which mounts the lower end of an elevator 156. The elevator is similar to the aforementioned elevator 104 used on the pull-type harvester. Fixed to the pivot beams are a pair of angular supports 160 (FIG. 8) which are fixed at their upper ends to a generally rectangular frame 161. A lower support 162 is fixed to the bottom of the rectangular frame and extends rearwardly therefrom. The lower support 162 is also connected to the bottoms of the angular supports 160 by a set of brackets 163. A double acting hydraulic power cylinder 164, which is mounted on frame 13a, has a piston rod 164a connected to the rear end of the lower support 162. The pivot beams, angular supports, the rectangular frame 161, the lower support 162, and the brackets 163 form a rigid unit which pivots on the stub shafts about the lower end of the elevator upon actuation of the hydraulic cylinder 164.

Mounted in the rectangular frame 161 is a support ring 166. The support ring is journaled for rotation by bearing units 167 (FIG. 9) which prevent fore, aft and lateral movement of the support ring while permitting it to rotate. A set of spring mounted cables 168 are fastened to laterally extending ears 169 which are fixed to the support ring. The free ends of the cables are connected to the forward axle of the harvesting unit and tend to urge the support ring into a position in which the tops of the ears are parallel to the front axle of the harvester.

Extending forwardly of the support ring 166 and fixed thereto are a pair of upper pivot arms 170 and a lower pivot arm 171. The upper and lower pivot arms are fastened to a transverse, tubular support brace 172 (FIG. 10). Bolted to the upper surface of the left-hand end of the tubular support brace is a motor support plate 178. Also fastened to the upper surface of the tubular support brace are left-hand and right-hand shaft supports 179 (FIG. 8) and 180 (FIG. 11), respectively. Welded to the outer face of the right-hand shaft support is an upright bracket 181. The upright bracket has a longitudinal slot 181a which receives an actuating rod 182. The actuating rod moves between a set of switch actuators 183 and 183a which are fastened to the bracket. A pair of apertured blocks 184 are fastened to the bottom surface of the tubular support brace 172 at opposite ends thereof. Each of the blocks slidably receives an adjustable stop-bolt 186. The actuating rod 182, switch actuators 183, and stopbolts 186 have an inter-related function to be hereinafter described.

Rotatably journaled on the upper pivot arms 170 are rear and forward octagonal rollers 188 and 189, respectively. A left-hand gear box 192 (FIG. 10) is bolted to the tubular support brace 172 and has a drive shaft connected to the axle of an upright hexagonal drum 193. A right-hand gear box 190 is also mounted on the tubular support brace and has a drive shaft connected to an upright hexagonal drum 191. A transverse shaft 194 drivingly connects the output shaft of gear box 190 to input of gear box 192, and the drums 191 and 193 are arranged to rotate toward each other from front to rear as indicated by the arrows in FIGURES 10 and 12. As can be readily seen, the octagonal rollers, hexagonal drums, and all of the aforementioned structure which is fastened to the tubular support brace oscillate with the support ring 166 about the longitudinal axis of the harvester while simultaneously oscillating about the tubular stub shafts 152.

Journaled in the shaft supports 179 and 180 is a cylindrical intermediate roller 198 (FIG. 10) having shaft extensions 198a and 198b projecting from its ends. Pivotally mounted on the shaft extensions 198a and 198b are lefthand and right-hand side plates 199 (FIG. 8) and 200 (FIG. 11), respectively. A cylindrical forward roller 205 has shaft extensions 205a rotatably journaled in the side plates also. A transverse cross-brace 201 is fixed to laterally extending rear flanges 202 formed integral with the side plates. Fastened to the cross-brace are a pair of transversely spaced stop-bolt mounts 203 which pivotally support the free ends of the stop-bolts 186. The side plates and the cross-brace are free to pivot as a unit about the shaft supports within the limits of the adjustable stop-bolts.

The pick-up unit 18, as in the pull-type harvester previously described, comprises a conventional pick-up reel 206 having a plurality of resiliently mounted tines 207. The reel is mounted on stub axles 208 which are journaled in the respective side plates 199 and 200.

As best shown in FIGURES 8 and 12, the front end of the gathering unit 15 is supported by a wheel support assembly which comprises two sets of angle braces 210 and 212 which are connected, respectively, to the lefthand and right-hand ends of the cross-brace 201. The upper ends of the sets of angle braces are fixed to a transverse wheel support frame 213. A set of wheels 214 are mounted on adjustable upright bearing posts 215 which are journaled for rotation on the wheel support frame. It should be noted that the left-hand wheel has been removed in FIGURE 8 for purposes of clarity. As should be readily apparent from FIGURE 8, the wheels will follow the contour of the ground, causing the pick-up reel and forward roller to pivot on the shaft extensions 198a and 198b. As the gathering unit is extremely heavy, it is undesirable to support the full weight thereof on the wheels. This problem is overcome, however, since the leveling device 150 is supported from the forward end of the threshing unit 13 and is positioned by the hydraulic cylinder 164. Thus, only part of the weight of the gathering unit is supported by the wheels. It is necessary, however, that the leveling device also be raised and lowered to follow the contour of the ground.

In order to efficiently move vines from the pickup unit 15 to the elevator 156, it is desirable that the orientation of the rollers 189 and 198 relative to the pick up unit be maintained within desired limits. Accordingly, the leveling device 150 is effective to vary the positions of these rollers in response to changes in the position of the pickup unit. As is best shown in FIGURE 11, the actuating rod 182 which extends through the slot in the bracket 181, is fastened to the rear edge of the right-hand side plate 200 and extends rearwardly between the two switch actuators 183 and 183a. Should the wheels 214 move downwardly, as for example when the harvester just begins to go down a steep hill, the actuating rod will pivot upwardly to engage the upper switch actuator 183. The switch associated with actuator 183 is connected by conventional circuitry to control valves, not shown, which will admit high pressure fluid to the appropriate end of the hydraulic cylinder 164. In the example given, with the wheels moving downwardly, upward movement of the actuating rod will control the switch associated with actuator 183 in a manner such that the control valve is actuated and the piston rod 164a is retracted so that the leveling device is also lowered. By lowering the leveling device, the shaft supports 179 and 180 are also lowered thus returning the pick-up unit and the crop transfer unit approximately to their initial angular relationship. When the wheels begin to move up a steep rise, the actuating rod contacts the lower switch actuator 183a which activates the proper control valves to project the piston rod 164a out of its cylinder and raise the leveling device. Consequently, the leveling device continually makes adjustments in position of the rollers 189 and 198 in response to changes in position of the pick-up unit.

The drive for the pick-up reel and the various rollers is powered from a hydraulic motor 218 fastened to the motor support plate 178. The motor 218 (FIG. 10) drives a shaft 220 which is rotatably mounted in a bearing fixed to the motor support plate. A conventional first chain drive 221 (FIG. 8) connects the motor shaft 220 with the shaft extension 198a of the intermediate roller 198. A second chain drive 222 connects the shaft extension 198a with one of the shaft extensions 205a of the forward roller 205. A third chain drive 223 (FIG. 11) connects the forward roller with the pick-up reel. Still a fourth chain drive 224 (FIG. 10) connects the right-hand end of the intermediate roller 198 with the transverse shaft 194 which drives the upright hexagonal drums 191 and 193. A fifth chain drive 225 (FIGS. 10 and 11) connects the transverse shaft 194 with the forward and rear octagonal rollers 188 and 189. Thus rotation of the motor shaft 220 rotates the pick-up reel, forward roller, the two octagonal rollers, and the upright hexagonal drums in directions to transfer the vines from the pick-up reel rearwardly to the elevator 156. A tined drum 228 is interposed between the rear octagonal roller and the lower end of the elevator and is powered from the elevator by a chain drive 229 in a manner such that the drum will rotate to transfer vines passed from the rear octagonal roller to the elevator.

An important feature of the self-contained vine crop harvester, as in the pull-type vine crop harvester previously described, is the angle of the top surfaces of the forward octagonal roller 189 and the round intermediate roller 198. This angle is best described by referring to FIGURE 8 wherein the line D represents a plane which is tangent to the top surfaces of the two rollers. The line D forms an angle y with the horizontal, shown as line indicated by the reference character H. As in the pull-type vine crop harvester, this angle is important and unless kept within a maximum downward limit of approximately 15° the vines will ball up at the upright hexagonal drums and will not be transferred rearwardly to the elevator. This is again accomplished by the relative vertical position of the forward octagonal roller 189 with respect to the intermediate cylindrical roller and, in addition, since the self-contained type vine crop harvester must traverse very hilly ground, the forward and rear octagonal rollers are provided to increase the length of the gathering unit so that the wheels 214 can traverse steep inclines without the crop transferring device 19 having to follow at an equally steep angle. Thus, by adding the two octagonal rollers and increasing the length of the pick-up angle y seldom exceeds the lower limit of 15°.

A second feature of importance is the shapes of the two octagonal rollers 188 and 189 since, as was mentioned for the pull-type vine crop harvester, it is necessary that these rollers assist to pull the vines between the upright hexagonal drums and to throw them rearwardly onto the tined drum 228. These important shapes coupled with the round shape of the intermediate roller 198 provide for effective transfer of vine crops.

Thus, the advantages of the two vine crop harvesters should be readily apparent. With the above described mechanisms, vine crops can be easily gathered from the ground and transferred to an elevator without becoming hopelessly entangled. An advantage of the self-contained vine crop harvester is that it can traverse extremely hilly ground and still effectively gather the crops. Still another advantage is that both of the vine crop harvesters are easily controlled and manipulated as they traverse the ground.

Although preferred embodiments of the present invention have been shown and described, it will be understood that various changes and modifications may be made in the details thereof, without departing from the spirit and scope of the appended claims.

Having thus described the invention, what is new and desired to be secured by Letters Patent is:

1. In portable apparatus for harvesting vine crops having an elevated inlet for receiving the crop and a gathering unit, said gathering unit comprising a power driven pickup unit including rotary finger means for engaging and lifting the crop from the ground, rotary transfer means cooperable with said rotary finger means for receiving the crop therefrom and transferring it rearwardly to said elevated inlet, and compressing means disposed above and adjacent said rotary transfer means for confining the crop to a predetermined lateral path of travel, said rotary transfer means including a set of two rollers having crop transfer surfaces, and means for mounting said rotary transfer means and said pickup unit on said gathering unit so that a line drawn across said crop transfer surfaces will not exceed an angle of 15 degrees downwardly with respect to the horizontal whereby the vine crop can be effectively moved between and rearwardly of said compressing means.

2. Apparatus defined by claim 1 wherein said harvesting apparatus is of the self-contained type.

3. Apparatus as defined by claim 1 wherein one of said set of two rollers is an octagonal roller.

4. Apparatus as defined by claim 3 wherein said compressing means includes a set of generally upright hexagonal drums.

5. Apparatus as defined by claim 3 wherein said harvesting unit is of the pull-type.

6. Apparatus defined by claim 2 wherein said gathering unit further includes articulately joined forward and rearward sections, and means for adjusting said rearward section relative to said forward section for maintaining said line drawn across said crop transfer surfaces of said set of two rollers at said angle less than 15 degrees downwardly relative to the horizontal.

7. Apparatus defined by claim 6 wherein said adjusting means includes a hydraulic actuator, and means responsive to the relative positions of said forward and rearward sections for energizing said hydraulic actuator and move said rearward section relative to said forward section.

8. Apparatus defined by claim 2 wherein said compressing means includes a set of generally upright hexagonal drums.

9. Apparatus defined by claim 7 wherein said compressing means includes a set of generally upright hexagonal drums.

10. Apparatus defined by claim 7 wherein one of said set of two rollers is octagonal and wherein said rotary crop transferring means also includes a second octagonal roller positioned between said set of two rollers and said elevated inlet.

References Cited
UNITED STATES PATENTS

| | | | |
|---|---|---|---|
| 2,507,540 | 5/1950 | Nolt | 56—364 |
| 2,517,413 | 8/1950 | Pearson | 56—364 |
| 2,796,722 | 6/1957 | Hanford et al. | 56—364 |
| 2,940,240 | 6/1960 | Schaaf et al. | 56—21 |

HUGH R. CHAMBLEE, *Primary Examiner.*